(12) United States Patent
Tsai

(10) Patent No.: US 12,323,206 B2
(45) Date of Patent: Jun. 3, 2025

(54) UPLINK CODEBOOK DESIGN FOR DEVICE COLLABORATION

(71) Applicant: MEDIATEK INC., Hsinchu (TW)

(72) Inventor: Lung-Sheng Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 133 days.

(21) Appl. No.: 18/229,280

(22) Filed: Aug. 2, 2023

(65) Prior Publication Data

US 2024/0080072 A1    Mar. 7, 2024

Related U.S. Application Data

(60) Provisional application No. 63/374,256, filed on Sep. 1, 2022.

(51) Int. Cl.
*H04B 7/0456*    (2017.01)
(52) U.S. Cl.
CPC .................................. *H04B 7/0482* (2013.01)
(58) Field of Classification Search
CPC .. H04B 7/0482; H04B 7/0486; H04B 7/0487; H04B 7/048; H04B 7/0481; H04B 7/0479; H04B 7/0478; H04B 7/0452; H04B 7/0456; H04B 7/0413
See application file for complete search history.

(56) References Cited

U.S. PATENT DOCUMENTS

| 12,207,255 B2 * | 1/2025 | Zhang | H04L 5/14 |
| 2023/0034640 A1 * | 2/2023 | Zhang | H04L 1/0025 |
| 2023/0319844 A1 * | 10/2023 | Yuan | H04B 7/022 |
| | | | 370/329 |

\* cited by examiner

*Primary Examiner* — Khanh C Tran
(74) *Attorney, Agent, or Firm* — Troutman Pepper Locke LLP; Tim Tingkang Xia, Esq.

(57) ABSTRACT

A UE receives a first precoder indication from a base station. The first precoder indication indicates a first precoder for a first antenna panel. The UE receives a second precoder indication from the base station. The second precoder indication indicates a second precoder for a second antenna panel. The UE receives an indication of first time-frequency resources from the base station for communicating via the first antenna panel. The UE receives an indication of second time-frequency resources from the base station for communicating via the second antenna panel. The UE transmits first signals generated according to the first precoder indication through the first antenna panel on the first time-frequency resources. The UE transmits second signals generated according to the second precoder indication through the second antenna panel on the second time-frequency resources.

20 Claims, 10 Drawing Sheets

UPLINK CODEBOOK DESIGN FOR DEVICE COLLABORATION

CROSS-REFERENCE TO RELATED APPLICATION(S)

This application claims the benefits of U.S. Provisional Application Ser. No. 63/374,256, entitled "CSI FRAMEWORK FOR DEVICE FORMED BY AGGREGATED COMPONENTS" and filed on Sep. 1, 2022, which is expressly incorporated by reference herein in their entirety.

BACKGROUND

Field

The present disclosure relates generally to communication systems, and more particularly, to techniques of determining uplink precoders for distributed multiple-input multiple-output (MIMO) transmitters/receivers.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a first precoder indication from a base station. The first precoder indication indicates a first precoder for a first antenna panel. The UE receives a second precoder indication from the base station. The second precoder indication indicates a second precoder for a second antenna panel. The UE receives an indication of first time-frequency resources from the base station for communicating via the first antenna panel. The UE receives an indication of second time-frequency resources from the base station for communicating via the second antenna panel. The UE transmits first signals generated according to the first precoder indication through the first antenna panel on the first time-frequency resources. The UE transmits second signals generated according to the second precoder indication through the second antenna panel on the second time-frequency resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
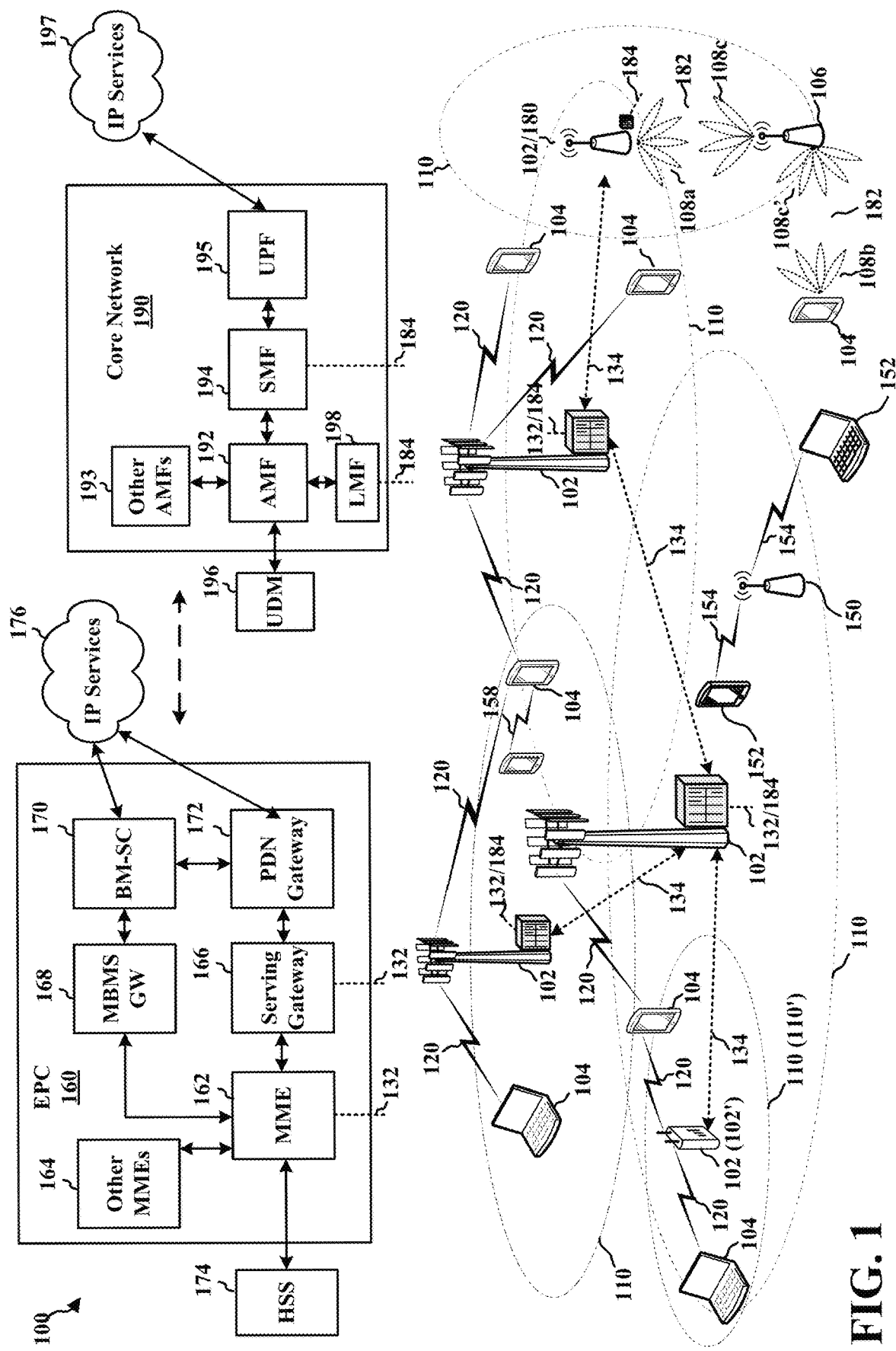
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
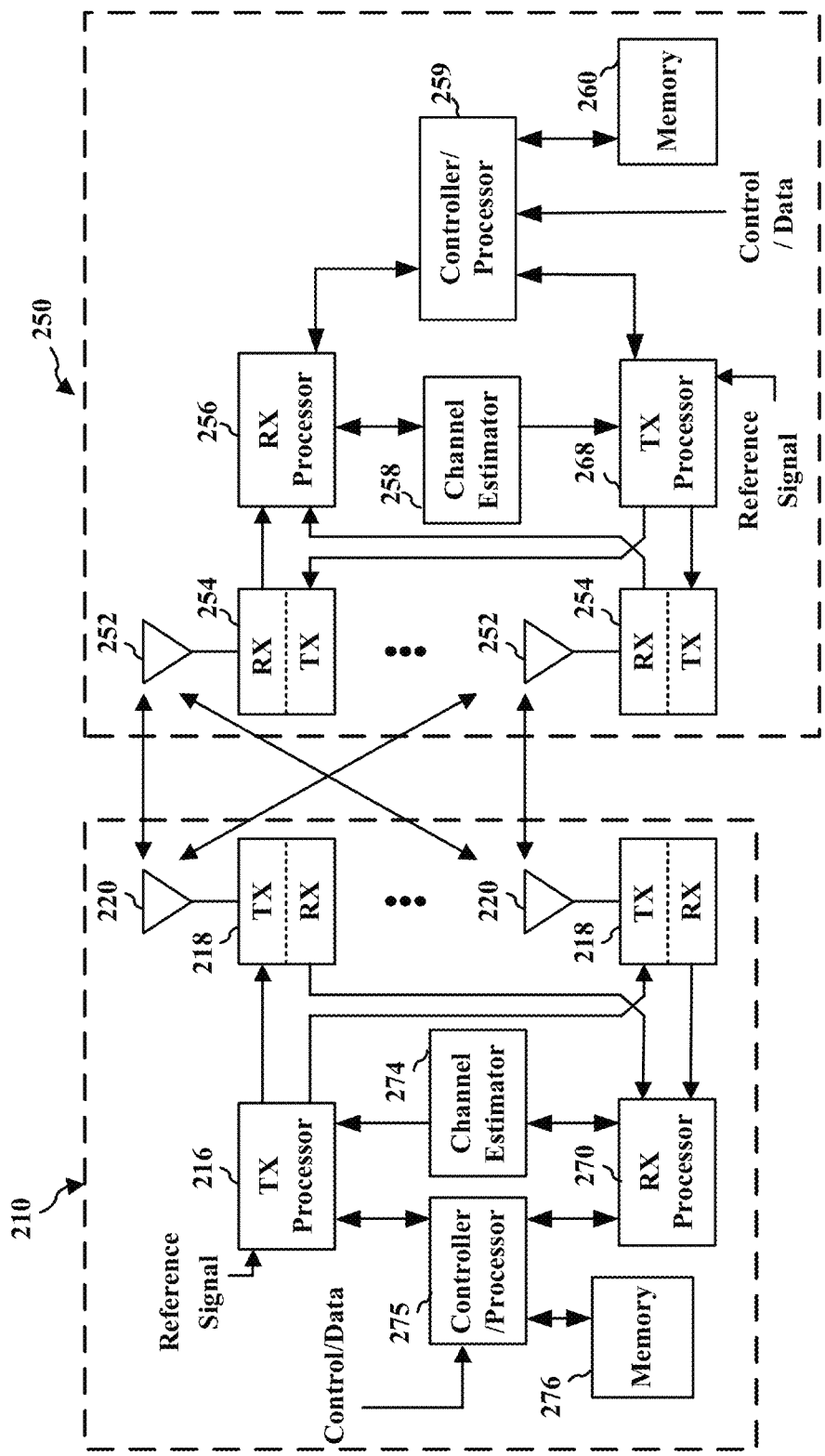
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier spacing (SCS) of 60 kHz over a 0.25 ms duration or a SCS of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
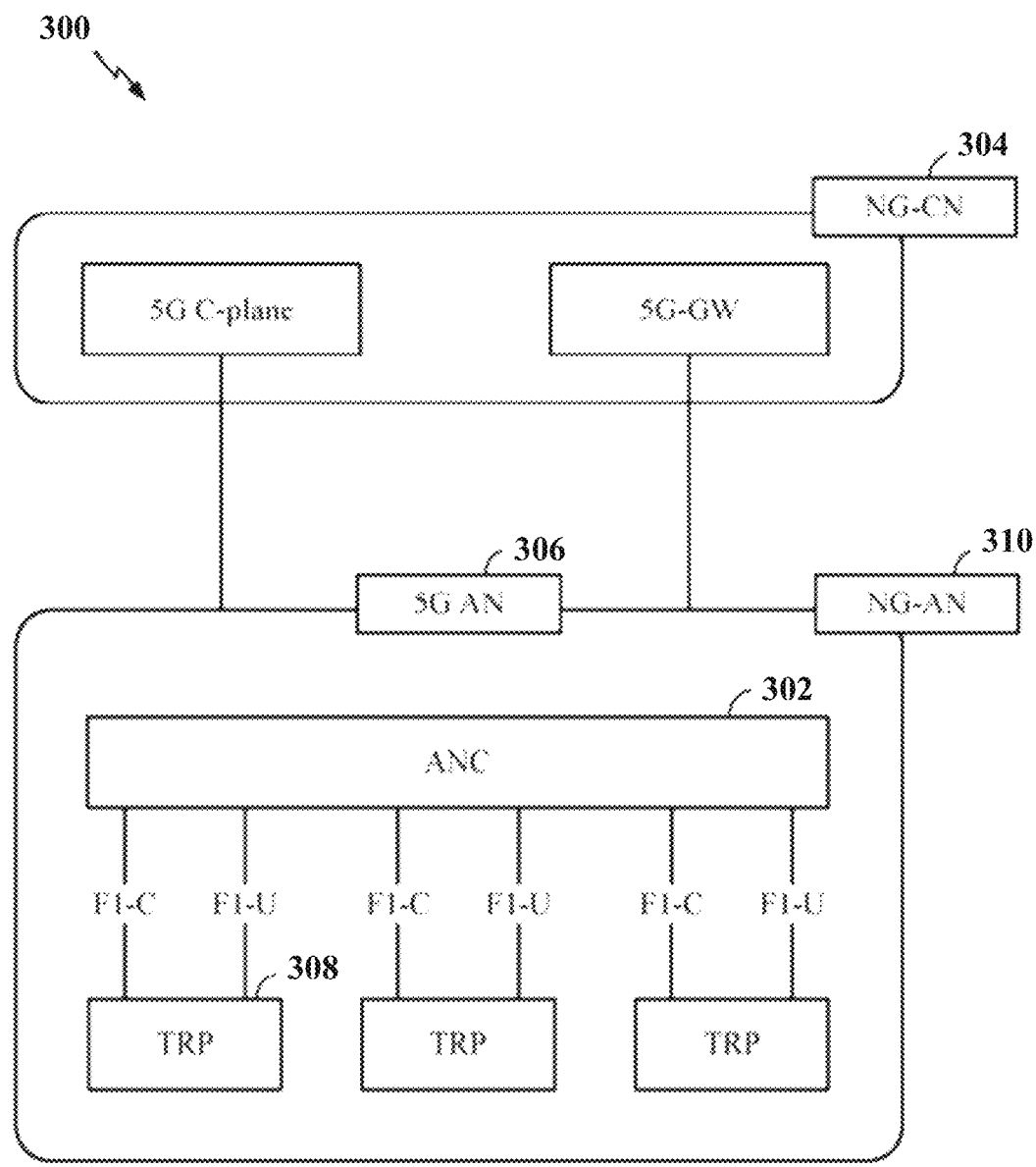
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
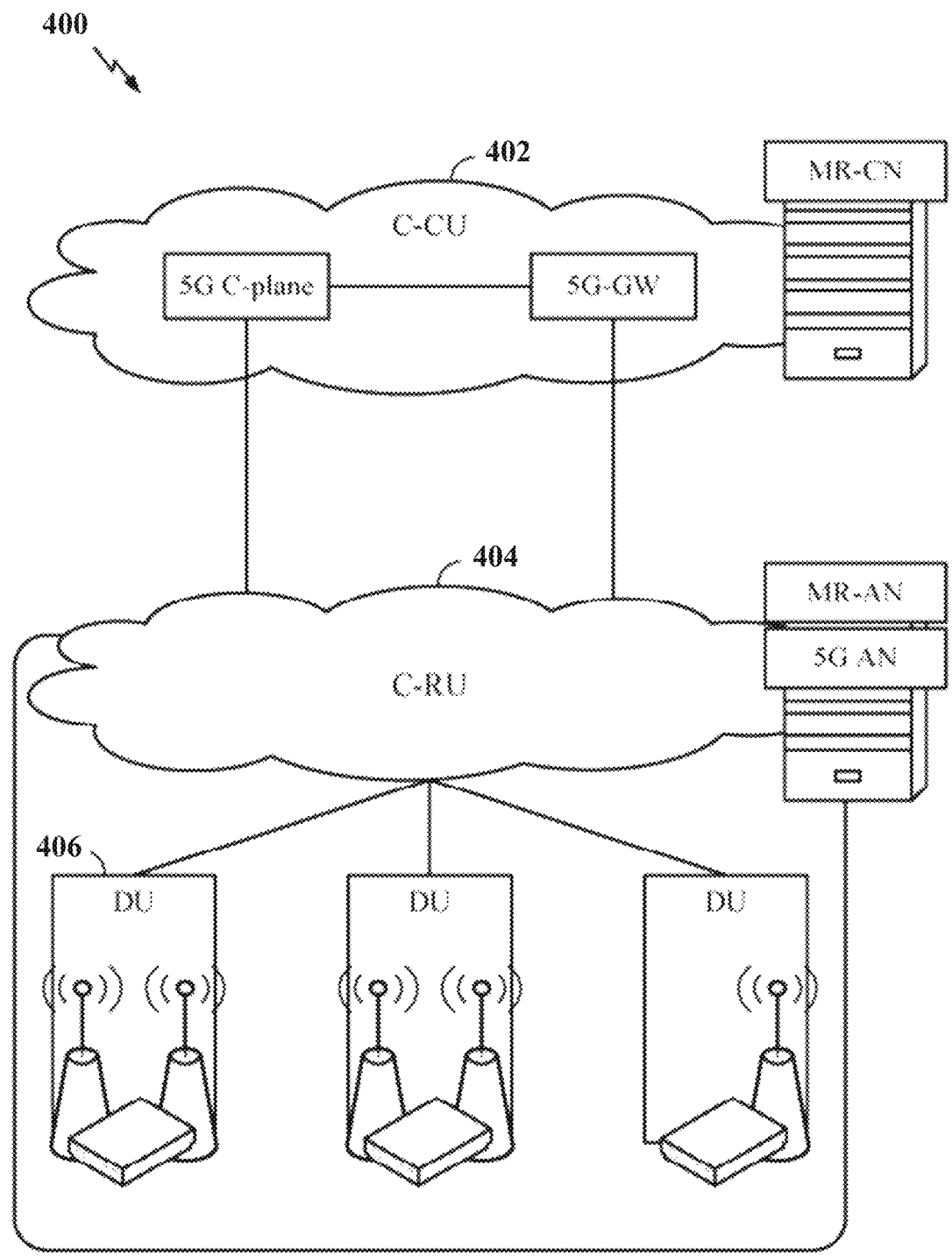
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
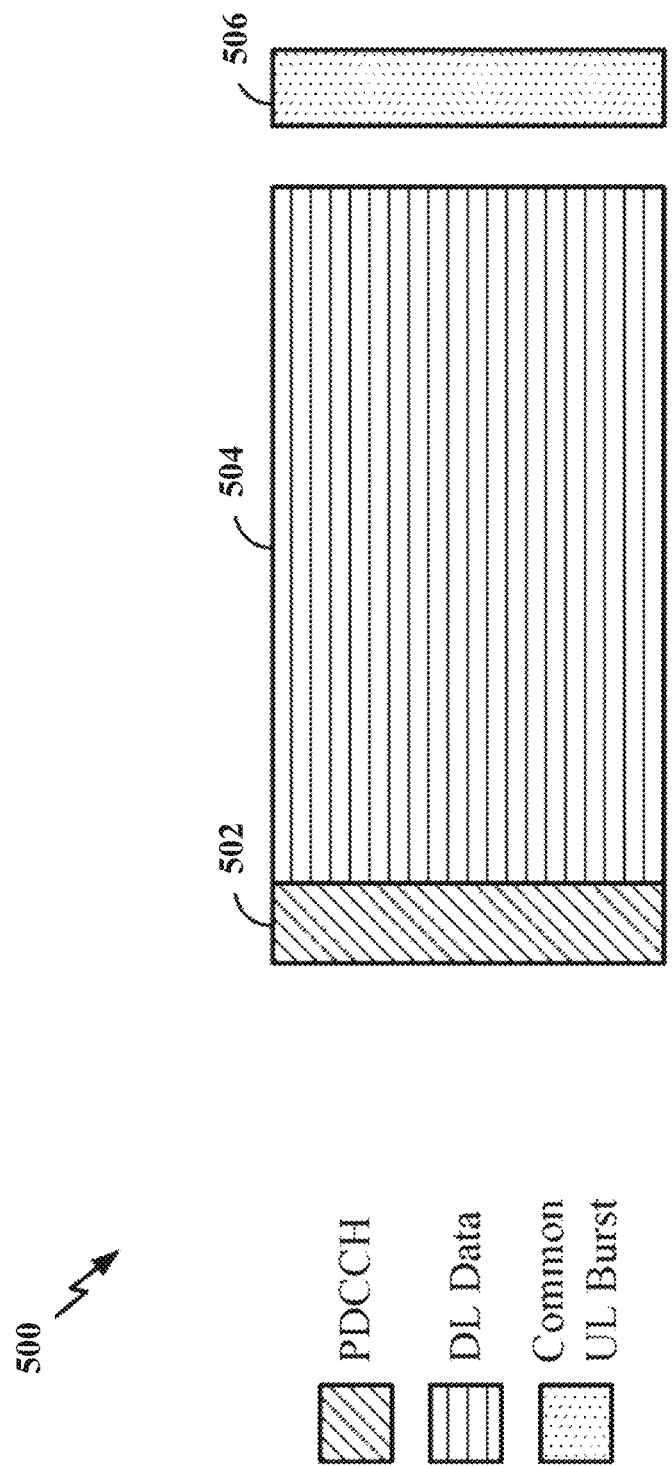
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
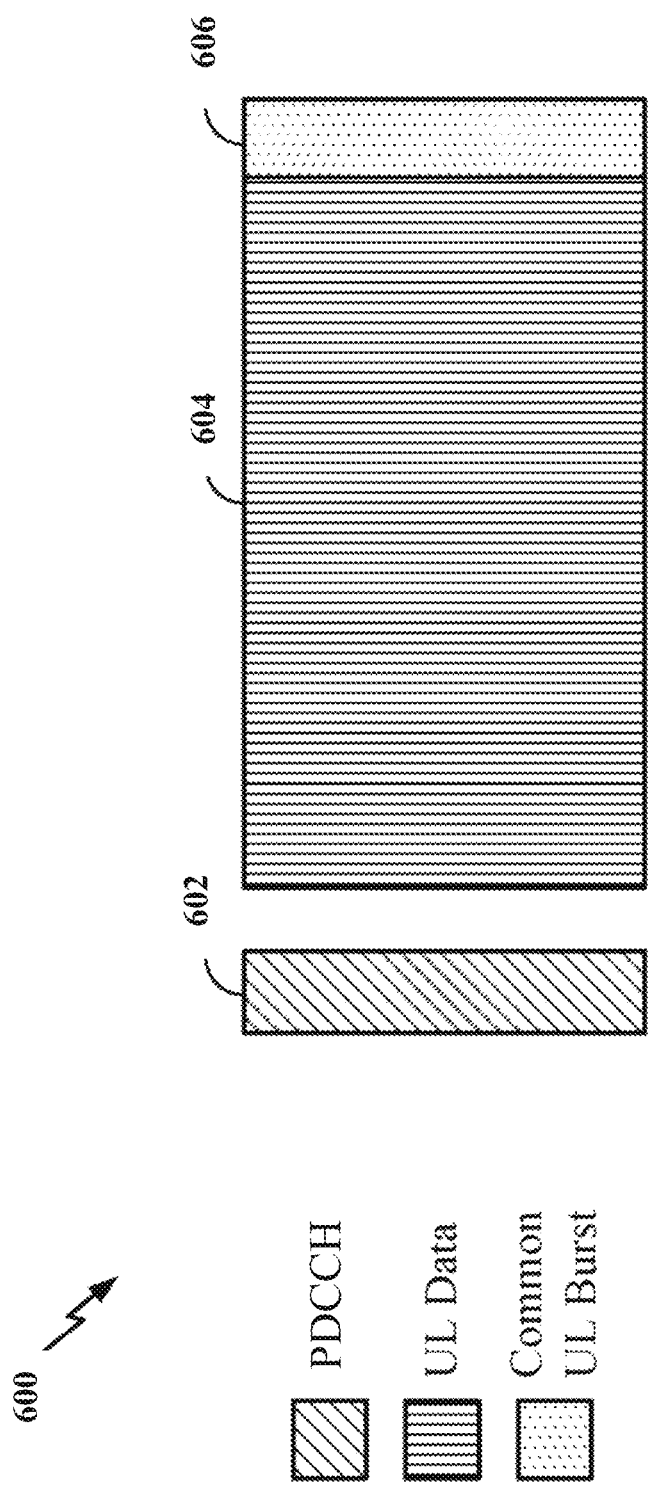
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
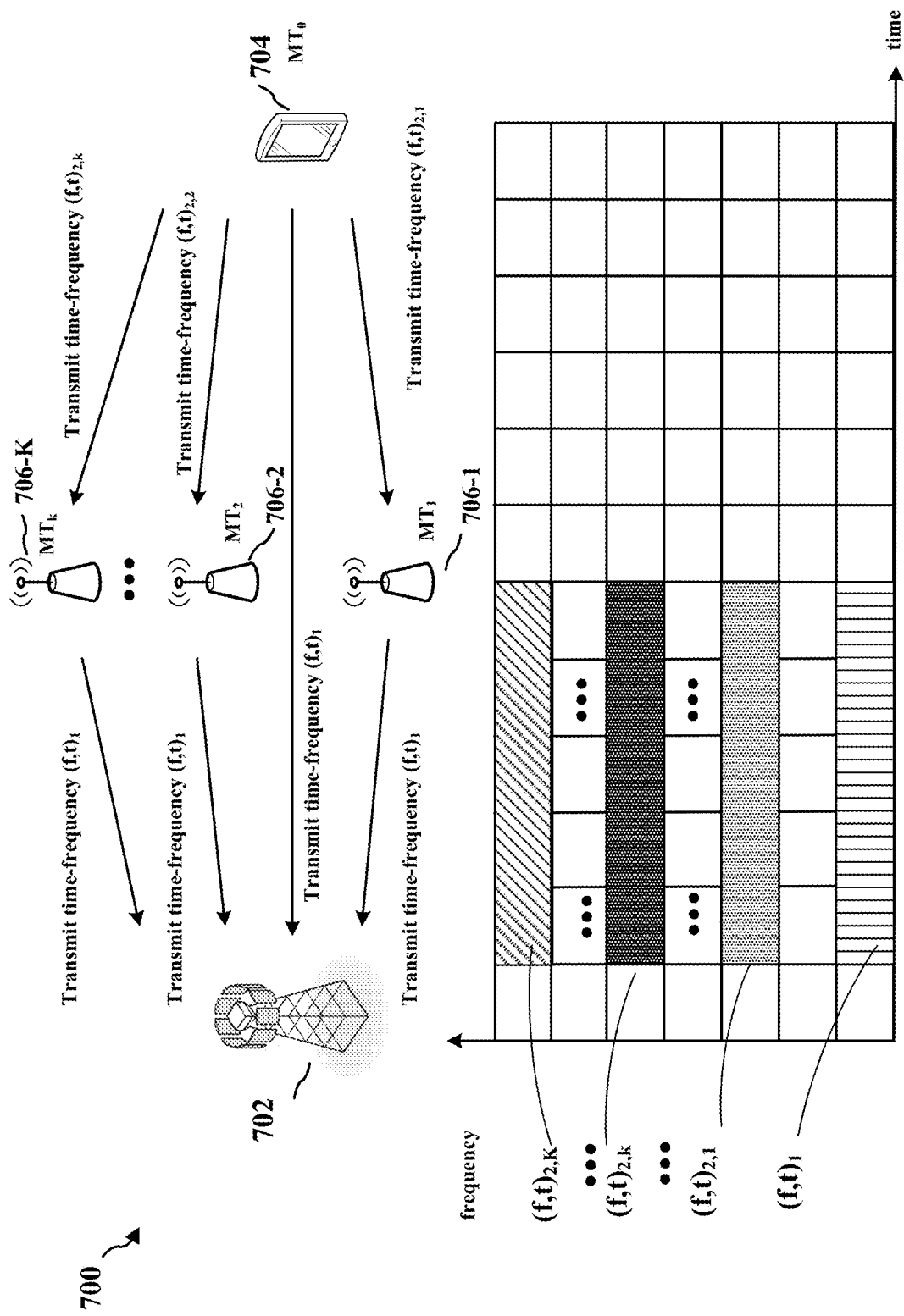
FIG. 7 is a diagram illustrating distributed MIMO transmission.

FIG. 7 is a diagram 700 illustrating distributed MIMO transmission. The present disclosure shows that multiple distributed low-rank mobile terminals (MTs) or wireless devices can form a high-rank MIMO transmitter/receiver. A base station 702 and a UE 704 communicate with each other via one or more repeaters. The repeaters may be wireless devices such as mobile phones, fixed customer premise equipment (CPE), and wireless routers. In this example, there are K repeaters 706-1, 706-2, . . . , 706-K (K is an integer and K≥1). The UE 704 and one or more of the the K repeaters 706-1, 706-2, . . . , 706-K may be connected together to form a high-rank MIMO transmitter/receiver network to expand the channel rank.

As described infra, a repeater receives RF signals on a first frequency band, shifts the RF carrier of the RF signals to a second frequency band, and then transmits the shifted RF signals on the second frequency band. Each frequency band is an interval in frequency domain. In particular, the repeater may be a frequency translating repeater. The repeater may also be a time delaying repeater, which receive RF signals and then re-transmit the received RF signals after some time delay. Further, the repeater may receive RF signals in a first time-frequency resource, translate the received RF signals to a second time-frequency resource, and then transmit the translated RF signals. In particular, the first time-frequency resource may be orthogonal with the second time-frequency resource.

This disclosure uses (f, t) to denote the time-frequency resources: $(f, t)_1$ denotes the time-frequency resource used by the base station for transmitting and receiving RF signals. $(f, t)_{2,k}$ denotes the resources used by a particular repeater $MT_k$ (k is an integer and 1≤k≤K) to receive RF signals. As such, $(f, t)_{2,1}$ indicates the resources that may be used by the UE 704 to transmit RF signals to the repeater 706-1 (i.e., $MT_1$); $(f, t)_{2,2}$ indicates the resources that may be used by the UE 704 to transmit signals to the repeater 708 (i.e., $MT_2$), and so on. In certain configurations, $(f, t)_1$, $(f, t)_{2,1}$, $(f, t)_{2,2}$, . . . and $(f, t)_{2,K}$ are orthogonal. In particular, they do not overlap in frequency domain. In certain configurations, $(f, t)_1$ may be the same as one $(f, t)_{2,k}$ (k∈1, . . . K), while the rest are orthogonal to each other. Further, $(f, t)_1$ and $(f, t)_{2,k}$ (1≤k≤K) can be non-overlapped component carriers, non-overlapped bandwidth parts (BWPs), non-overlapped frequency bands, or non-overlapped collections within the same component carrier.

In one example, the UE 704 may have 4 antenna ports (i.e., antenna ports 1 to 4) and may have 4 layers of data (i.e., layers 1 to 4) to be transmitted. In a first configuration, the UE 704 maps a particular layer to a particular antenna port. For example, the layer 1 data are transmitted through the antenna port 1, the layer 2 data through the antenna port 2, and so on. This is referred to as a non-coherent mode. In a second configuration, at the UE 704, at least one particular layer is mapped to at least two antenna ports and at least one antenna port is not mapped with at least one layer of the 4 layers of data. For example, the layer 1 data are transmitted through the antenna port 1 and the antenna port 2, the layer 2 data are transmitted through the antenna port 3 and the antenna port 4, . . . , and so on. This is referred to as a partial-coherent mode. In a third configuration, each layer of data is mapped to all antenna ports. This is referred to as a full-coherent mode.

Figure 8:
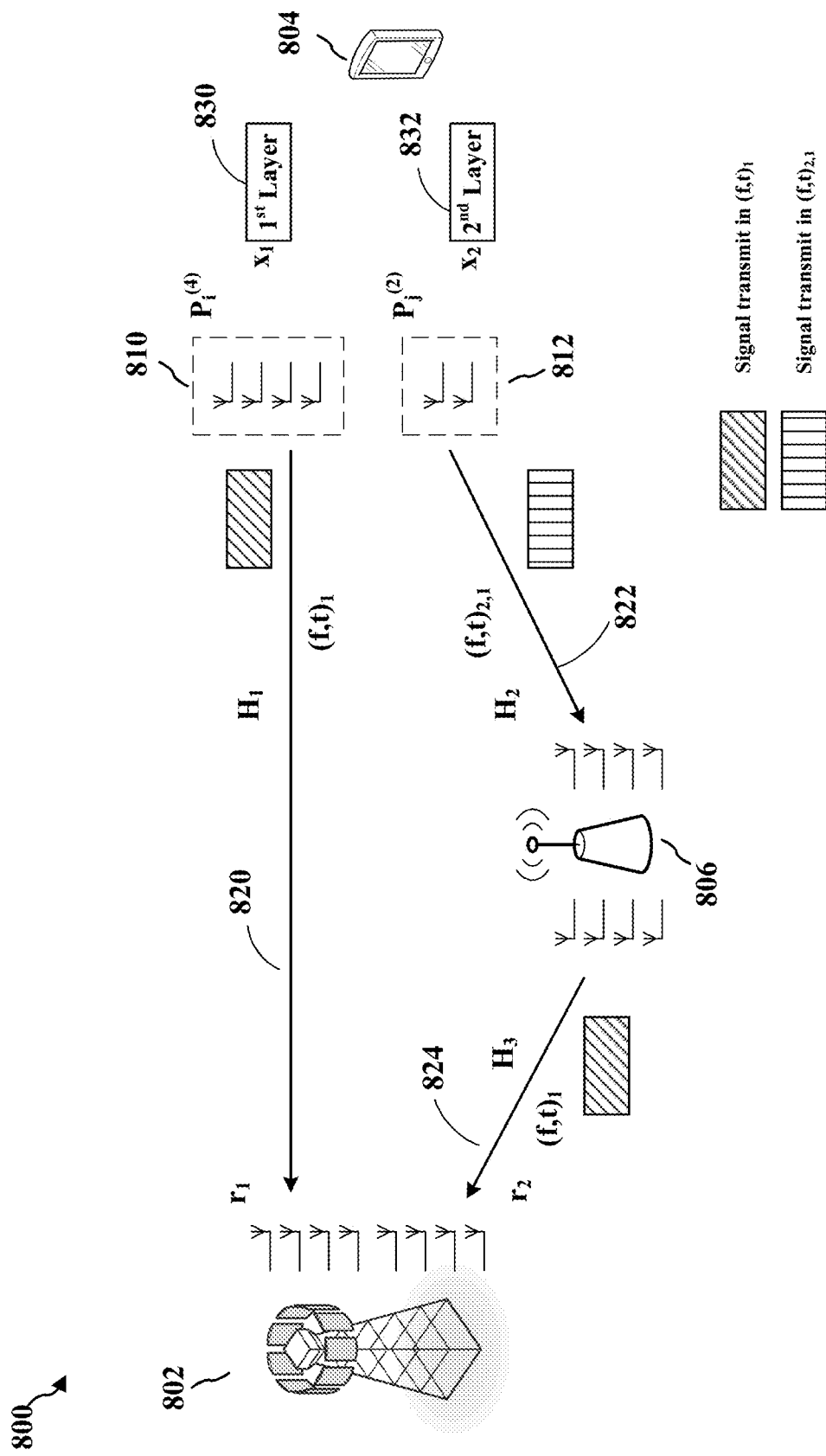
FIG. 8 is a diagram illustrating techniques of determining and signaling uplink precoders for distributed MIMO transmitters/receivers.

FIG. 8 is a diagram 800 illustrating techniques of determining and signaling uplink precoders for distributed MIMO transmitters/receivers. In this example, the base station 802 have 8 antennas. A repeater 806 is placed between the base station 802 and a UE 804. The repeater 806 has 4 reception antennas and 4 transmission antennas. The UE 804 is equipped with a first antenna panel 810 having with 4 transmission antennas transmitting at time-frequency resources $(f, t)_1$ and a second antenna panel 812 having 2 transmission antennas transmitting at time-frequency resources $(f, t)_{2,1}$. Further, the UE 804 can transmit RF signals at the first antenna panel 810 and second antenna panel 812 simultaneously.

In this example, the antenna panel 810 and the antenna panel 812 are formed by different groups of physical antennas and are not shared physical antennas. In other examples, it is possible that the first antenna panel 810 and the second antenna panel 812 are formed by the same group of physical antennas. From the base station 802's perspective, the UE 804 and the repeater 806 form an aggregated UE that communicates with the base station 802.

A UE can apply a precoder according to a different codebook configuration for each panel of multiple-panels. This allows for individual customization and optimization of the precoding process for each panel. The difference could be in term of the number of transmission antenna ports, the codebook type, the TCI-state, the beam/precoding direction, the transmission power and coherent, partial coherent or non-coherent transmission of each panel.

In this example, the UE 804 transmits a first set of SRSs through the first antenna panel 810 and a second set of SRSs through the second antenna panel 812. Based on the measurements of the two sets of SRSs, in certain configurations, the base station 802 can determine a first precoder matrix $p_i^{(4)}$ for mapping data signals to the first antenna panel 810 and a second precoder matrix $p_j^{(2)}$ for mapping data signals to the second antenna panel 812. The indices 4 and in precoder matrices indicate the number of antenna ports the precoders are designed for. The index i in the precoder matrix $p_i^{(4)}$ indicates that this precoder is the $i^{th}$ steering vector selected from a codebook designed for 4 antenna ports configured for the UE 804. The index j in the precoder matrix $p_j^{(2)}$ indicates that this precoder is the $j^{th}$ steering vector selected from a codebook designed for 2 antenna ports configured for the UE 804. In certain configurations, the precoder matrix $p_i^{(4)}$ and the precoder matrix $p_j^{(2)}$ each may be a linear combination of two or more steering vector vectors selected from their respective codebooks.

In general, for an antenna panel with n antennas, the $i^{th}$ steering vector selected from a corresponding codebook can be expressed as $p_i=[1\ e^{j\theta_{i,1}}\ \ldots\ e^{j\theta_{i,n-1}}]^T$. A steering vector for the first antenna panel 810 (4 antennas) can be expressed as $p_i^{(4)}=[1\ e^{j\theta_{i,1}}\ e^{j\theta_{i,2}}\ e^{j\theta_{i,3}}]^T$. The $j^{th}$ steering vector of the second antenna panel 812 (2 antennas) selected from a corresponding codebook can be expressed as $p_j^{(2)}=[1\ e^{j\theta_{j,1}}]^T$.

Further, each precoding vector could be linear combination of more than one steering vectors. After normalization, the precoding vector of a n-antenna panel is still in the form of $p_i^{(n)}=[1\ e^{j\theta_{i,1}}\ \ldots\ e^{j\theta_{i,n-1}}]^T$.

The selection of the precoders is in consideration of that multiple-panels transmit signal to different directions with different amplitudes or power levels. The different target receivers may exhibit variations in path loss, fading, or interference levels across different spatial directions. By adapting the power levels of the panels based on the channel conditions, the precoders can be selected to exploit the favorable channel directions and optimize the system performance.

In this example, the UE 804 may transmit a data symbol $x_1$ from a first layer 830 and a data data symbol $x_2$ from a second layer 832 simultaneously. For the non-coherent approach, data symbols carried by one layer is transmitted by only one antenna panel. A precoding vector corresponding to the antenna panel used to transmit a particular layer of data is applied to that layer of data. Accordingly, in this example, the UE 804 only transmits the data symbol $x_1$ through the first antenna panel 810 and only transmits the data symbol $x_2$ through the second antenna panel 812. The baseband signals transmitted on the first antenna panel 810 can be expressed as $p_i^{(4)}x^1$. The baseband signals transmitted on the second antenna panel 812 can be expressed as $p_j^{(2)}x_2$.

For the coherent approach, data carried by one layer is transmitted by more than one panel jointly. A precoding vectors to be applied to a particular layer of data may be in the form of stacking multiple precoding vectors corresponding to multiple component panels with an additional co-phasing factor. For a UE with two antenna panels, the precoding vector is as follows:

$$p = \begin{bmatrix} p_i^{(n_1)} \\ e^{j\varphi} p_j^{(n_2)} \end{bmatrix},$$

where $p_i^{(n_1)}$ corresponds precoding weighting coefficients to be applied to a first antenna panel with $n_1$ antennas and $p_j^{(n_2)}$ corresponds to precoding weighting coefficients to be applied to a second antenna panel with $n_2$ antennas. $e^{j\varphi}$ is the co-phasing factor that is used to adjust the relative phase difference of the same data symbol transmitted by the two different antenna panels such that they are added constructively at the base station 802.

In this example, the data symbol $x_1$ may be transmitted by both the first antenna panel 810 and the second antenna panel 812. The baseband signals transmitted on the first antenna panel 810 and the second antenna panel 812 together can be expressed as $$\begin{bmatrix} p_i^{(4)} \\ e^{j\varphi} p_j^{(2)} \end{bmatrix} x_1 = \begin{bmatrix} \begin{bmatrix} 1 \\ e^{j\theta_{i,1}} \\ e^{j\theta_{i,2}} \\ e^{j\theta_{i,3}} \end{bmatrix} \\ e^{j\varphi} \begin{bmatrix} 1 \\ e^{j\theta_{j,1}} \end{bmatrix} \end{bmatrix} x_1 = \begin{bmatrix} 1 \\ e^{j\theta_{i,1}} \\ e^{j\theta_{i,2}} \\ e^{j\theta_{i,3}} \\ e^{j\varphi_j} \\ e^{j(\varphi_j + \theta_{j,1})} \end{bmatrix} x_1$$

Further, each of the multiple antenna panels may apply different precoders to different layer of data signals to target different directions. Therefore, the UE 804 may receive multiple precoders $p_i^{(4)}$ to be applied to the first antenna panel 810, multiple precoders $p_j^{(2)}$ to be applied to the second antenna panel 812, and/or multiple co-phasing factors $e^{j\varphi}$.

Thus, the CSI determined for the UE 804 by the base station 802 may include several separate components such as the precoder $p_i^{(4)}$, the precoder $p_j^{(2)}$, the co-phasing factors $e^{j\varphi}$, etc. for different antenna panels. The precoders for different antenna panels may be selected according to different codebook configurations due to the differences in terms of the number of transmission antenna ports, the codebook type, the TCI-state or beam/precoding direction, the transmission power per panel, and coherent, partial coherent or non-coherent transmission.

More specifically, the base station 802 determines for each antenna panel of the UE 804 the CSI and transmission configurations, which include one or more of the following corresponding components: the number of transmission antenna ports, the codebook type, the TCI-state or beam/precoding direction, the transmission power per panel, and the precoding vector. The base station 802 also determines the co-phasing factor for each pair of antenna panels (e.g., the first antenna panel 810 and the second antenna panel 812) of the UE 804.

The base station 802 may transmit each component of the transmission configurations and CSI separately to the UE 804 (e.g., through separate DCI transmissions). Several associated components may be signaled together. Those components do not need to signaled to the UE 804 at the same time. The base station 802 may decide to signal/update certain components to the UE 804 and not to signal/update certain other components. For example, while the repeater 806 and the UE 804 move together relatively to the base station 802, the relative position of the repeater 806 to the UE 804 may not be changed for a period of time. Therefore, the base station 802 may more frequently update the precoder $p_i^{(4)}$ to the UE 804, but less frequently update the precoder $p_j^{(2)}$. Further, each panel can be treated as part of aggregated transmission antennas contributed by all panels or virtual panels.

In another approach, the base station 802 may decide precoders across multi-panels according to a single codebook with sufficient number of transmission antenna ports, which equals the sum of antenna ports of all panels. In this example, the base station 802 may treat the first antenna panel 810 with 4 antennas and the second antenna panel 812 with 2 antennas jointly as one antenna panel with 6 antennas. Accordingly, the base station 802 may decide a joint precoder according to a codebook configured for 6 transmission antennas as $p^{(6)}=[1\ e^{j\Theta_{i,1}}\ e^{j\Theta_{i,2}}\ e^{j\Theta_{i,3}}\ e^{j\Theta_{i,4}}\ e^{j\Theta_{i,5}}]^T$.

Figure 9:
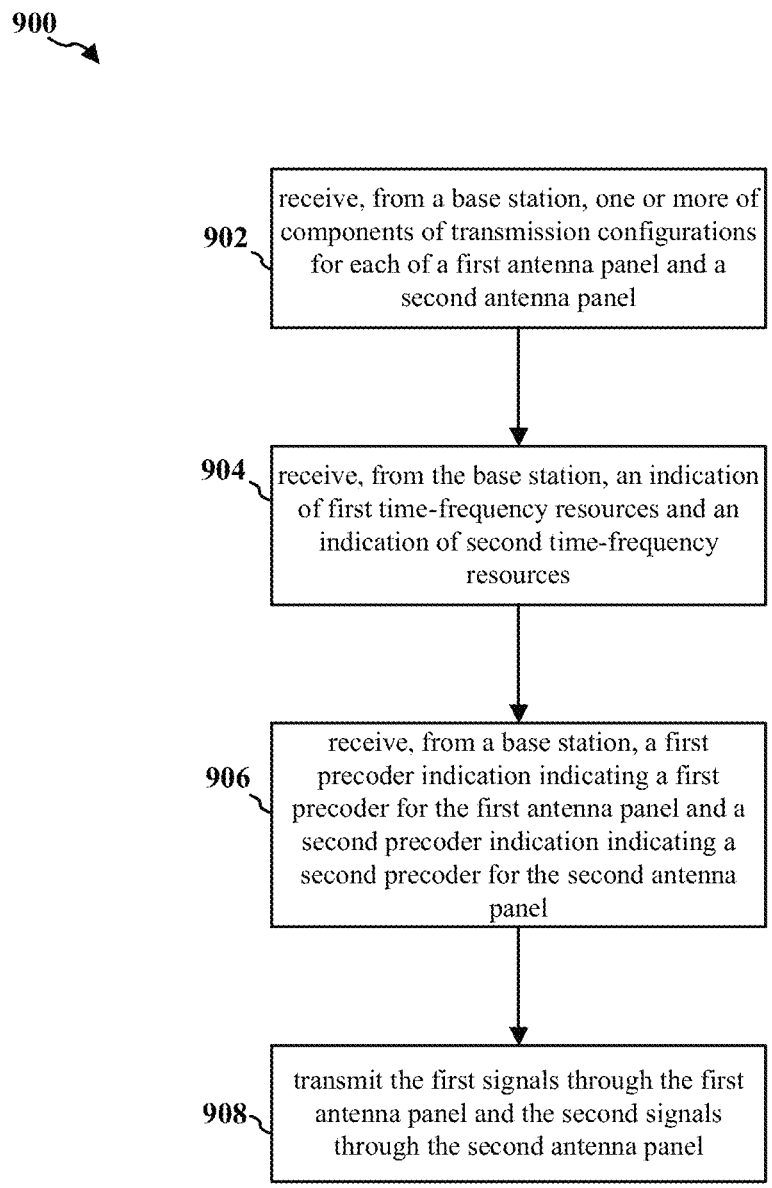
FIG. 9 is a flow chart of a method (process) for transmitting uplink signals through multiple antenna panels.

FIG. 9 is a flow chart 900 of a method (process) for transmitting uplink signals through multiple antenna panels. The method may be performed by a UE (e.g., the UE 704, the UE 804). In operation 902, the UE receives, from a base station, one or more of the following components of transmission configurations for each of a first antenna panel and a second antenna panel of the UE: a number of transmission antenna ports, a codebook type, a transmission channel-interference information (TCI)-state or beam direction, a transmission power, a precoding vector or matrix, and a co-phasing factor with respect to the other antenna panel.

In operation 904, the UE receives, from the base station, an indication of first time-frequency resources for communicating via the first antenna panel and an indication of second time-frequency resources for communicating via the second antenna panel. The indication of second time-frequency resources may be signaled implicitly by deriving from the indication of first time-frequency resources.

In operation 906, the UE receives, from a base station, a first precoder indication indicating a first precoder for the first antenna panel and a second precoder indication indicating a second precoder for the second antenna panel. In certain configurations, the UE further receives, from the base station, a co-phasing factor to adjust a relative phase difference of first signals and second signals. The first signals are generated according to the first precoder indication. The second signals are generated according to the second precoder indication. The co-phasing factor is used to adjust the first signals or the second signals such that the first signals and the second signals are added constructively at the base station. In certain configurations, the UE also receive, from the base station, a third precoder indication indicating a third precoder to be used by a third antenna panel on a repeater, and forwards the third precoder indication to the repeater.

In certain configurations, the first precoder indication and the second precoder indication are jointly carried by a control signal sent by the base station. In certain configurations, the first precoder indication and the second precoder indication are received separately from the base station. In certain configurations, the first precoder indication is received more frequently than the second precoder indication being received. In certain configurations, the first precoder indication is indicated to be the same as a last precoder indication.

In operation 908, the UE transmits the first signals through the first antenna panel on the first time-frequency resources. The UE transmits the second signals through the second antenna panel on the second time-frequency resources. The first signals and the second signals may be transmitted simultaneously.

In certain configurations, the first precoder and the second precoder are based on different codebooks. In certain configurations, the first signals correspond to a first data signal of a first layer and the second signals correspond to a second data signal of a second layer. In certain configurations, the first signals and the second signals both correspond to a same data signal of a spatial layer.

Figure 10:
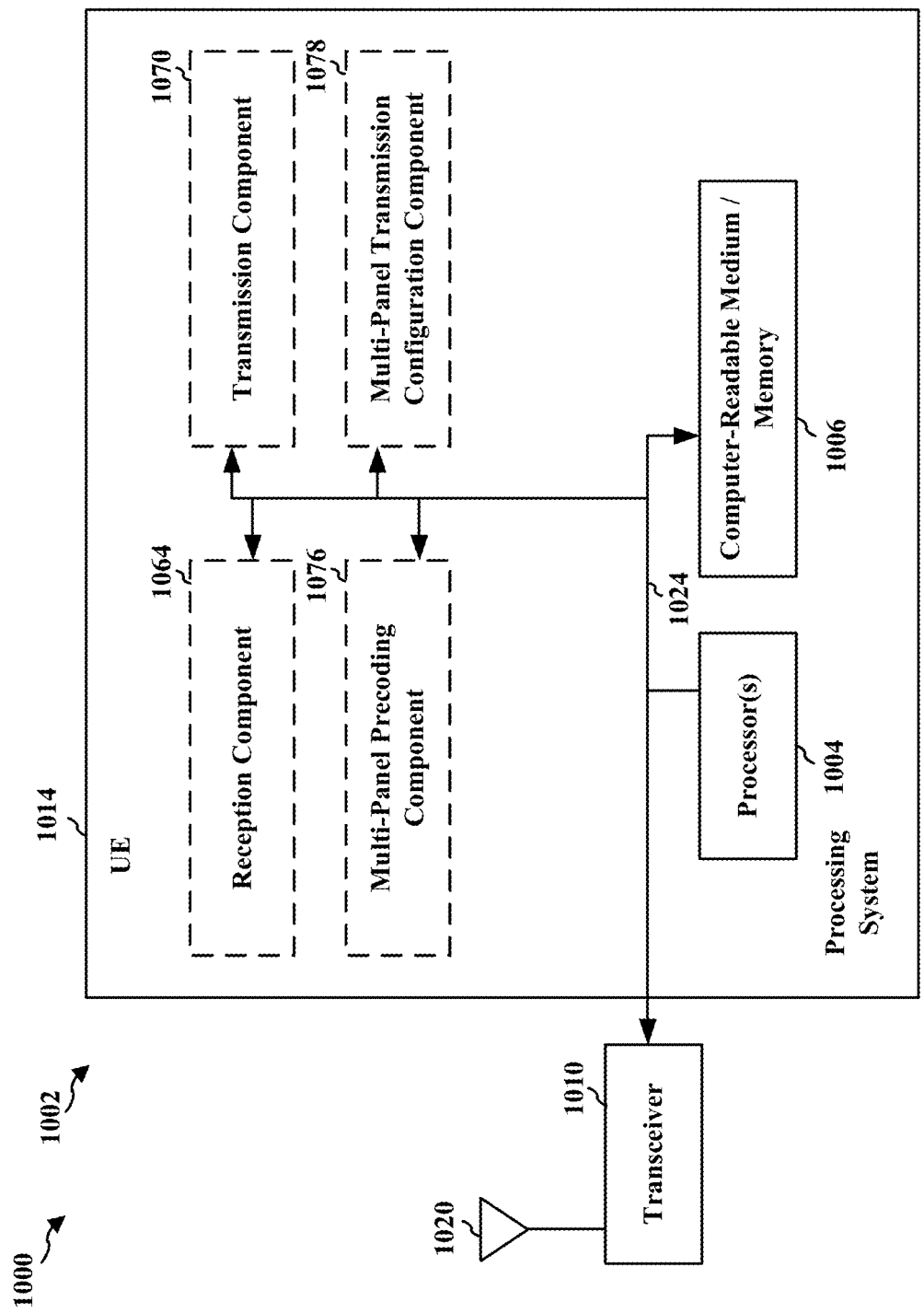
FIG. 10 is a diagram illustrating an example of a hardware implementation for an apparatus employing a processing system.

FIG. 10 is a diagram 1000 illustrating an example of a hardware implementation for an apparatus 1002 employing a processing system 1014. The apparatus 1002 may be a UE (e.g., the UE 704 or the UE 804). The processing system 1014 may be implemented with a bus architecture, represented generally by a bus 1024. The bus 1024 may include any number of interconnecting buses and bridges depending on the specific application of the processing system 1014 and the overall design constraints. The bus 1024 links together various circuits including one or more processors and/or hardware components, represented by one or more processors 1004, a reception component 1064, a transmission component 1070, a multi-panel precoding component 1076, a multi-panel transmission configuration component 1078, and a computer-readable medium/memory 1006. The bus 1024 may also link various other circuits such as timing sources, peripherals, voltage regulators, and power management circuits, etc.

The processing system 1014 may be coupled to a transceiver 1010, which may be one or more of the transceivers 254. The transceiver 1010 is coupled to one or more antennas 1020, which may be the communication antennas 252.

The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 1064. In addition, the transceiver 1010 receives information from the processing system 1014, specifically the transmission component 1070, and based on the received information, generates a signal to be applied to the one or more antennas 1020.

The processing system 1014 includes one or more processors 1004 coupled to a computer-readable medium/memory 1006. The one or more processors 1004 are responsible for general processing, including the execution of software stored on the computer-readable medium/memory 1006. The software, when executed by the one or more processors 1004, causes the processing system 1014 to perform the various functions described supra for any particular apparatus. The computer-readable medium/memory 1006 may also be used for storing data that is manipulated by the one or more processors 1004 when executing software. The processing system 1014 further includes at least one of the reception component 1064, the transmission component 1070, the multi-panel precoding component 1076, and the multi-panel transmission configuration component 1078. The components may be software components running in the one or more processors 1004, resident/stored in the computer readable medium/memory 1006, one or more hardware components coupled to the one or more processors 1004, or some combination thereof. The processing system 1014 may be a component of the UE 250 and may include the memory 260 and/or at least one of the TX processor 268, the RX processor 256, and the communication processor 259.

In one configuration, the apparatus 1002 for wireless communication includes means for performing each of the operations of FIGS. 11-12. The aforementioned means may be one or more of the aforementioned components of the apparatus 1002 and/or the processing system 1014 of the apparatus 1002 configured to perform the functions recited by the aforementioned means.

As described supra, the processing system 1014 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    receiving, from a base station, a first precoder indication indicating a first precoder for a first antenna panel and a second precoder indication indicating a second precoder for a second antenna panel;
    receiving, from the base station, an indication of first time-frequency resources for communicating via the first antenna panel and an indication of second time-frequency resources for communicating via the second antenna panel;
    transmitting first signals generated according to the first precoder indication through the first antenna panel on the first time-frequency resources; and
    transmitting second signals generated according to the second precoder indication through the second antenna panel on the second time-frequency resources.

2. The method of claim 1, wherein the first precoder indication and the second precoder indication are jointly carried by a control signal sent by the base station.

3. The method of claim 1, further comprising:
    receiving, from the base station, a third precoder indication indicating a third precoder to be used by a third antenna panel on a repeater; and
    forwarding the third precoder indication to the repeater.

4. The method of claim 1, wherein the first precoder indication and the second precoder indication are received separately from the base station.

5. The method of claim 1, wherein the first precoder indication is received more frequently than the second precoder indication being received.

6. The method of claim 1, wherein the first precoder indication is indicated to be the same as a last precoder indication.

7. The method of claim 1, further comprising:
    receiving, from the base station, a co-phasing factor to adjust a relative phase difference of the first signals and the second signals.

8. The method of claim 7, wherein the co-phasing factor is used to adjust the first signals or the second signals such that the first signals and the second signals are added constructively at the base station.

9. The method of claim 1, wherein the first precoder and the second precoder are based on different codebooks.

10. The method of claim 1, wherein the first signals correspond to a first data signal of a first layer and the second signals correspond to a second data signal of a second layer.

11. The method of claim 1, wherein the first signals and the second signals both correspond to a same data signal of a spatial layer.

12. The method of claim 1, further comprising:
    receiving, from the base station, one or more of the following components of transmission configurations for each of the first antenna panel and the second antenna panel:
    a number of transmission antenna ports,
    a codebook type,
    a transmission channel-interference information (TCI)-state or beam direction,
    a transmission power,
    a precoding vector or matrix, and
    a co-phasing factor with respect to the other antenna panel.

13. An apparatus for wireless communication, the apparatus being a user equipment (UE), comprising:
    a memory; and
    at least one processor coupled to the memory and configured to:
        receive, from a base station, a first precoder indication indicating a first precoder for a first antenna panel and a second precoder indication indicating a second precoder for a second antenna panel;
        receive, from the base station, an indication of first time-frequency resources for communicating via the first antenna panel and an indication of second time-frequency resources for communicating via the second antenna panel;

transmit first signals generated according to the first precoder indication through the first antenna panel on the first time-frequency resources; and transmit second signals generated according to the second precoder indication through the second antenna panel on the second time-frequency resources.

14. The apparatus of claim 13, wherein the first precoder indication and the second precoder indication are jointly carried by a control signal sent by the base station.

15. The apparatus of claim 13, wherein the at least one processor is further configured to:

receive, from the base station, a third precoder indication indicating a third precoder to be used by a third antenna panel on a repeater; and forward the third precoder indication to the repeater.

16. The apparatus of claim 13, wherein the first precoder indication and the second precoder indication are received separately from the base station.

17. The apparatus of claim 13, wherein the first precoder indication is received more frequently than the second precoder indication being received.

18. The apparatus of claim 13, wherein the first precoder indication is indicated to be the same as a last precoder indication.

19. The apparatus of claim 13, wherein the at least one processor is further configured to:

receive, from the base station, a co-phasing factor to adjust a relative phase difference of the first signals and the second signals.

20. The apparatus of claim 19, wherein the co-phasing factor is used to adjust the first signals or the second signals such that the first signals and the second signals are added constructively at the base station.

* * * * *